US006371357B1

(12) United States Patent
Watanabe

(10) Patent No.: US 6,371,357 B1
(45) Date of Patent: Apr. 16, 2002

(54) HIGHLY GAS TIGHT CHAMBER AND METHOD OF MANUFACTURING SAME

(75) Inventor: Katsumi Watanabe, Tokyo (JP)

(73) Assignee: Furakawa Electric Co., Inc. (JP)

( * ) Notice: Subject to any disclaimer, the term of this patent is extended or adjusted under 35 U.S.C. 154(b) by 0 days.

(21) Appl. No.: 09/608,880

(22) Filed: Jun. 30, 2000

Related U.S. Application Data

(62) Division of application No. 09/228,356, filed on Jan. 11, 1999.

(30) Foreign Application Priority Data

Jan. 12, 1998 (JP) ........................................ 10-16336
Jun. 18, 1998 (JP) ........................................ 10-188198

(51) Int. Cl.[7] .......................... B23K 31/00; B23K 9/00; F27B 5/14

(52) U.S. Cl. ....................... 228/138; 228/205; 228/135; 219/390

(58) Field of Search ................................ 228/138, 205, 228/262.5, 135, 227, 228; 174/50.5; 219/390, 520, 521, 538, 544

(56) References Cited

U.S. PATENT DOCUMENTS 3,909,209 A * 9/1975 Kruper et al. ............ 29/183.5
4,229,927 A * 10/1980 Day ............................ 53/433
4,262,184 A * 4/1981 Cerutti ........................ 219/58
4,793,903 A * 12/1988 Holmquist et al. ........... 204/33
5,230,459 A * 7/1993 Mueller et al. ............. 228/164
5,322,740 A * 6/1994 Ghosh ........................ 428/649
5,736,675 A * 4/1998 Michaels ................... 174/50.5
5,826,331 A * 10/1998 Myers et al. ............ 29/888.09
5,836,506 A * 11/1998 Hunt et al. ................. 228/172
5,844,205 A * 12/1998 White et al. ................ 219/388
6,002,109 A * 12/1999 Johnsgard et al. .......... 219/390
6,073,830 A * 6/2000 Hunt et al. ................. 228/203

* cited by examiner

*Primary Examiner*—M. Alexandra Elve
*Assistant Examiner*—L. Edmondson
(74) *Attorney, Agent, or Firm*—Cantor Colburn LLP

(57) ABSTRACT

A hermetically sealed chamber and the method of manufacturing same, which comprises the steps of:

(a) preparing two aluminum or aluminum alloy material members which face each other;

(b) forming at least one extending groove portions on a surface to be metal-bonded of one of the two aluminum or aluminum alloy material members, which groove portion extends in a manner to make an enclosure;

(c) forming at least one corresponding extending protruding portions on a surface to be metal-bonded of the other of the two aluminum or aluminum alloy material members, which protruding portion extends in a manner to make a corresponding enclosure; and (d) receiving internally packaged parts therebetween, inserting the at least one extending protruding portions into the at least one corresponding extending groove portions so as to be fitted, and causing the at least one extending protruding portions and the at least one extending groove portions to be metal-bonded by press-forging.

9 Claims, 14 Drawing Sheets

(a)

(a)

(b)

(a)

(b)

(a)

(b)

(a)

(b)

HIGHLY GAS TIGHT CHAMBER AND METHOD OF MANUFACTURING SAME

CROSS-REFERENCE TO RELATED APPLICATION

This application is a divisional application of U.S. Pat. No. 09/228,356, filed Jan. 11, 1999, which is herein incorporated by reference in its entirety.

FIELD OF THE INVENTION

The present invention relates to a hermetically sealed chamber and a method of manufacturing same, in particular, relates to a hermetically sealed substrate holder of a semiconductor fabrication equipment or a flat panel display fabrication equipment in which internally packaged parts such as a heater, a thermocouple, an electrode, different metals, different materials and the like are hermetically enclosed by aluminum or aluminum alloy material in such manner as not to cause a pressure leakage, and the method of manufacturing same.

BACKGROUND OF THE INVENTION

In general, the substrate holder of the semiconductor fabrication equipment and the like is formed by aluminum or aluminum alloy material. The internally packaged parts such as a heater, a thermocouple, an electrode, different metals, different materials or the like is hermetically enclosed therein in such manner as not to cause a pressure leakage. There is known substrate holders of the semiconductor fabrication equipment as shown in FIGS. 16 to 18 as a conventional substrate holder of the semiconductor fabrication equipment.

FIG. 16 shows a substrate holder which is formed by the steps of receiving a heater and a thermocouple (7), different metals or different materials (8) as the internally packaged parts in the recessed portion formed by two aluminum material members (11), (12), and then welding the outer peripheral portions (13) of the aluminum material members (11), (12). In the lower portion of the substrate holder, there is provided a terminal (9) of the heater and thermocouple.

FIG. 17 shows another substrate holder which is formed by the step of casting aluminum material into a prescribed mold so as to hermetically enclose internally packaged parts such as a heater and a thermocouple (7), different metals or different materials (8) and the like in an aluminum material member (14).

FIG. 18 shows other substrate holder which is formed by the steps of receiving a heater and a thermocouple (7), different metals or different materials (8) as internally packaged parts in the recessed portion formed by two aluminum material members (11), (12); providing an O-ring (15) on the surfaces to be contacted of the aluminum material members (11), (12); and bolting the aluminum material members (11), (12) with bolts (16).

The conventional substrate holder in which the outer peripheral portions of the aluminum material members (11), (12) are welded, as shown in FIG. 16, has such a problem that the manufacturing cost is expensive, since the outer peripheral portions have to be welded all around. In addition, since pin holes are produced during the welding and the gas is involved during the welding, when the substrate holder of the semiconductor fabrication equipment is used within the chamber under highly reduced pressure (high degree of vacuum), the leakage from the pin holes lowers the degree of vacuum, and the gas contaminates the chamber, thus deteriorating the reliability of the function of the fabricated semiconductor to lead a lower productivity.

The conventional substrate holder formed by casting to enclose the internally packaged parts, as shown in FIG. 17, has such a problem that the internally packaged parts are possibly damaged, since molten aluminum or aluminum alloy is used. In addition, since pin holes are produced during the casting and the gas is involved during the casting, when the substrate holder of the semiconductor fabrication equipment is used within the chamber under highly reduced pressure (high degree of vacuum), the leakage from the pin holes lowers the degree of vacuum, and the gas contaminates the chamber, thus deteriorating the reliability of the function of the fabricated semiconductor to lead a lower productivity.

The conventional substrate holder formed by applying the O-ring as a sealing material, and bolting the aluminum material members, as shown in FIG. 18, has such a problem that the heat resistance of the sealing material affects the substrate holder, thus at the temperature over 300 degrees centigrade the substrate holder is not sustainable. In addition, there is required to have the space to accommodate the grooves for receiving the sealing material and the bolt holes for bolting, thus not enabling the substrate holder to be compact.

The object of the present invention is therefore to provide a hermetically sealed chamber, in particular, the substrate holder of the semiconductor fabrication equipment or the flat panel display fabrication equipment, which has higher reliability even used under such high degree of vacuum as $10^{-8}$ to $10^{-10}$ Torr, and at high temperature.

SUMMARY OF THE INVENTION

The inventors have studied so as to solve the above-mentioned problems of the conventional substrate holder. As a result, it was found that a hermetically sealed chamber which can be used even under high vacuum and at high temperature can be obtained by the following steps: forming an extending groove portion on the surface to be bonded of one aluminum material body, forming a corresponding extending protruding portion on the surface to be bonded of the other aluminum material body, fitting the protruding portion into the groove portion, and causing the protruding portion and the groove portion to be metal-bonded by press-forging.

The present invention was made on the basis of the above finding. The first embodiment of the method of manufacturing the hermetically sealed chamber of the present invention comprises steps of:

(a) preparing two aluminum or aluminum alloy material members which face each other;

(b) forming at least one extending groove portions on a surface to be metal-bonded of one of, said two aluminum or aluminum alloy material members, which groove portion extends in a manner to make an enclosure;

(c) forming at least one corresponding extending protruding portions on a surface to be metal-bonded of the other of said two aluminum or aluminum alloy material members, which protruding portion extends in a manner to make a corresponding enclosure; and (d) receiving internally packaged parts therebetween, inserting said at least one extending protruding portions into said at least one corresponding extending groove portions so as to be fitted, and causing said at least one extending protruding portions and said at least one extending groove portions to be metal-bonded by press-forging.

The second embodiment of the method of manufacturing the hermetically sealed chamber of the present invention comprises the method, wherein a volume of said extending protruding portion is larger than a capacity of said extending groove portion.

The third embodiment of the method of manufacturing the hermetically sealed chamber of the present invention comprises the method, wherein in preparing said aluminum or aluminum alloy material members, each surface of said aluminum or aluminum alloy material members is washed by alkali and acid solution to be neutralized.

The fourth embodiment of the method of manufacturing the hermetically sealed chamber of the present invention comprises the method, wherein said press-forging is carried out by applying a stress of at least a hot flow stress of said aluminum or aluminum alloy material member on said surfaces of said aluminum or aluminum alloy material members to be press-forged at a temperature within a range of 300 to 500 degree centigrade.

The fifth embodiment of the method of manufacturing the hermetically sealed chamber of the present invention comprises the method, wherein said aluminum or aluminum alloy material members receiving the internally packaged parts comprise the same materials.

The sixth embodiment of the method of manufacturing the hermetically sealed chamber of the present invention comprises the method, wherein said aluminum or aluminum alloy material members receiving the internally packaged parts comprise different materials.

The seventh embodiment of the method of manufacturing the hermetically sealed chamber of the present invention comprises steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding extending protruding portions on a surface to be metal-bonded of the other of said two aluminum or aluminum alloy material members, which protruding portion extends in a manner to make a corresponding enclosure;

(d) forming extending convex portion outside said groove portion of one of said two aluminum or aluminum alloy material member, and/or outside said protruding portion of the other of said two other aluminum or aluminum alloy material members, which convex portion extends in a manner to make an enclosure; and (e) receiving internally packaged parts therebetween, inserting said at least one extending protruding portions into said at least one corresponding extending groove portions and fitting said convex portion, and causing said at least one extending protruding portions and said at least one extending groove portions to be metal-bonded by press-forging.

The eighth embodiment of the method of manufacturing the hermetically sealed chamber of the present invention comprises steps of:

(a) preparing two aluminum or aluminum alloy material members which face each other;

(b) forming at least one extending convex portions on a surface to be metal-bonded of one of said two aluminum or aluminum alloy material members, which convex portion extends in a manner to make an enclosure;

(c) forming at least one corresponding another extending convex portions on a surface to be metal-bonded of the other of said two aluminum or aluminum alloy material members, which another convex portion extends in a manner to make a corresponding enclosure; and (d) receiving internally packaged parts therebetween, fitting said at least one extending convex portions and said at least one corresponding another extending convex portions, and causing said at least one extending convex portions and said at least one another extending convex portions to be metal-bonded by press-forging.

The ninth embodiment of the method of manufacturing the hermetically sealed chamber of the present invention comprises steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding another extending groove portions on a surface to be metal-bonded of the other of said two aluminum or aluminum alloy material members, which another extending groove portion extends in a manner to make a corresponding enclosure;

(d) receiving internally packaged parts therebetween, and inserting at least one intermediate aluminum or aluminum alloy material members between said at least one extending groove portions and said at least one another extending groove portions; and (e) fitting said at least one extending groove portions, said at least one another extending groove portions, and said at least one intermediate aluminum or aluminum alloy material members, and causing said at least one extending groove portions, said at least one intermediate material portions, and said at least one another extending groove portions to be metal-bonded by press-forging.

The tenth embodiment of the method of manufacturing the hermetically sealed chamber of the present invention comprises the method, wherein said chamber comprises a substrate holder of a semiconductor fabrication equipment or a flat panel display fabrication equipment encasing said internally packed parts.

The first embodiment of the hermetically sealed aluminum or aluminum alloy chamber, encapsulating internally packaged parts, of the present invention comprises the chamber manufactured by the steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding extending protruding portions on a surface to be metal-bonded of the other of said two aluminum or aluminum alloy material members, which protruding portion extends in a manner to make a corresponding enclosure; and (d) receiving internally packaged parts therebetween, inserting said at least one extending protruding portions into said at least one corresponding extending groove portions so as to be fitted, and causing said at least one extending protruding portions and said at least one extending groove portions to be metal-bonded by press-forging.

The second embodiment of the hermetically sealed chamber of the present invention comprises that a volume of said extending protruding portion is larger than, or equal to a capacity of said extending groove portion.

The third embodiment of the hermetically sealed chamber of the present invention comprises the chamber manufactured, wherein in preparing said aluminum or aluminum alloy material members, each surface of said aluminum or aluminum alloy material members is washed by alkali and acid solution to be neutralized.

The fourth embodiment of the hermetically sealed chamber of the present invention comprises the chamber manufactured, wherein said press-forging is carried out by applying a stress of at least a hot flow stress of said aluminum or aluminum alloy material member on said surfaces of said aluminum or aluminum alloy material members to be press-forged at a temperature range of 300 to 500 degree centigrade.

The fifth embodiment of the hermetically sealed chamber of the present invention comprises that said aluminum or aluminum alloy material members receiving the internally packaged parts comprise the same materials.

The sixth embodiment of the hermetically sealed aluminum or aluminum alloy chamber, hermetically enclosing internally packaged parts, of the present invention comprises that said aluminum or aluminum alloy material members receiving the internally packed parts comprise different materials.

The seventh embodiment of the hermetically sealed chamber of the present invention comprises the chamber manufactured by steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding extending protruding portions on a surface to be metal-bonded of the other of said two aluminum or aluminum alloy material members, which protruding portion extends in a manner to make a corresponding enclosure;

(d) forming an extending convex portion outside said extending groove portion of one of said two aluminum or aluminum alloy material members, and/or outside said extending protruding portion of the other of said two other aluminum or aluminum alloy material members, which convex portion extends in a manner to make an enclosure; and (e) receiving internally packaged parts therebetween, inserting said at least one extending protruding portions into said at least one extending groove portions and fitting said extending convex portion, and causing said at least one extending protruding portions and said at least one extending groove portions to be metal-bonded by press-forging.

The eighth embodiment of the hermetically sealed aluminum or aluminum alloy chamber, hermetically enclosing internally packed parts, of the present invention comprises the chamber manufactured by steps of:

(a) preparing two aluminum or aluminum alloy material members which face each other;

(b) forming at least one extending convex portions on a surface to be metal-bonded of one of said two aluminum or aluminum alloy material members, which convex portion extends in a manner to make an enclosure;

(c) forming at least one corresponding another extending convex portions on a surface to be metal-bonded of the other of said two aluminum or aluminum alloy material members, which another convex portion extends in a manner to make a corresponding enclosure; and (d) receiving internally packaged parts therebetween, fitting said at least one extending convex portions and said at least one another extending convex portions, and causing said at least one extending convex portions and said at least one another extending convex portions to be metal-bonded by press-forging.

The ninth embodiment of the hermetically sealed aluminum or aluminum alloy chamber, hermetically enclosing internally packed parts, of the present invention comprises the chamber manufactured by steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding another extending groove portions on a surface to be metal-bonded of the other of said two aluminum or aluminum alloy material members, which groove portion extends in a manner to make a corresponding enclosure;

(d) receiving internally packaged parts therebetween, and inserting at least one intermediate aluminum or aluminum alloy material members between said at least one extending groove portions and said at least one another extending groove portions; and (e) fitting said at least one extending groove portions, said at least one another extending groove portions, and said at least one intermediate aluminum or aluminum alloy material members, and causing said at least one extending groove portions, said at least one intermediate material portions, and said at least one another extending groove portions to be metal-bonded by press-forging.

The tenth embodiment of the hermetically sealed aluminum or aluminum alloy chamber, hermetically enclosing internally packaged parts, of the present invention comprises that said chamber comprises a substrate holder of a semiconductor fabrication equipment or a flat panel display fabrication equipment hermetically enclosing said internally packaged parts.

The eleventh embodiment of the hermetically sealed aluminum or aluminum alloy chamber, hermetically enclosing internally packaged parts, of the present invention comprises that said substrate holder of said semiconductor fabrication equipment or said flat panel display fabrication equipment is surface-treated by alumite or plating.

The twelfth embodiment of the hermetically sealed chamber of the present invention comprises that said chamber comprises a chamber for fabricating a semiconductor.

BRIEF DESCRIPTION OF THE DRAWINGS

FIG. 1(*b*) is a schematic plane sectional view of a substrate holder of a semiconductor fabrication equipment or a flat panel display fabrication equipment of the present invention;

DETAILED DESCRIPTION OF ILLUSTRATIVE EMBODIMENTS

Figure 1:
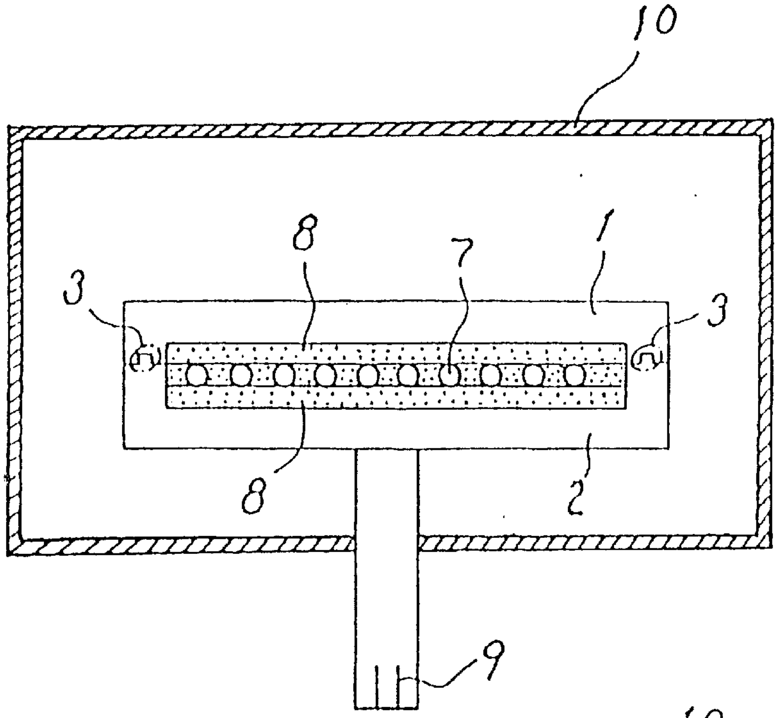
FIG. 1(*a*) is a schematic side sectional view of a substrate holder of a semiconductor fabrication equipment or a flat panel display fabrication equipment of the present invention.
Figure 1:
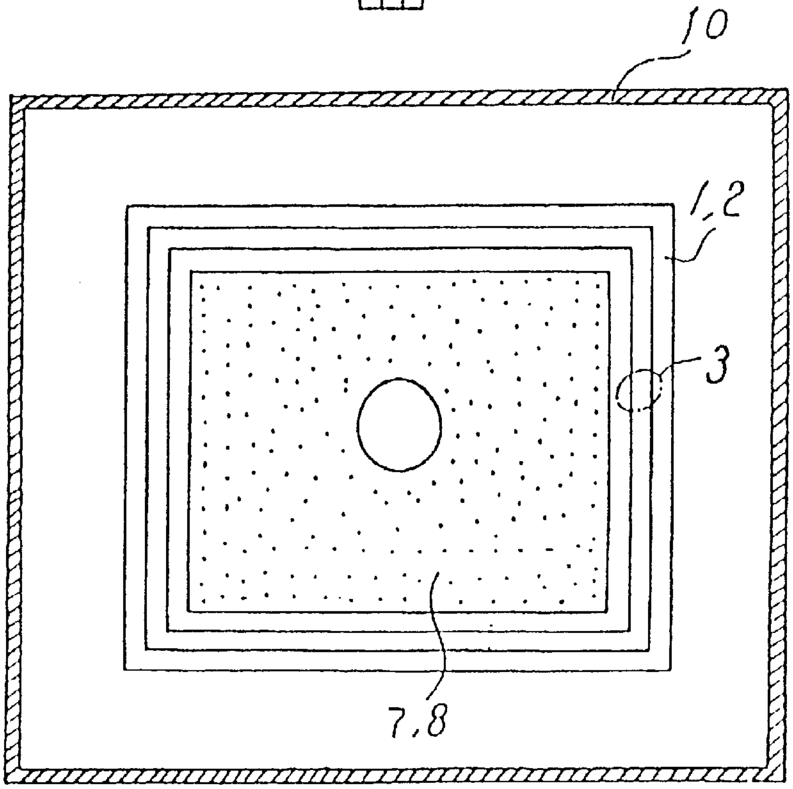

There are listed as a hermetically sealed chamber of the present invention a container for an industrial waste, in particular a container for a radioactive waste, a chamber for a semiconductor fabrication equipment, a chamber for a flat panel display fabrication equipment, a substrate holder of a semiconductor fabrication equipment or flat panel fabrication equipment.

Firstly, a substrate holder of a semiconductor fabrication equipment or flat panel display fabrication equipment is described hereunder.

The substrate holder of a semiconductor fabrication equipment of flat panel display fabrication equipment of the present invention is manufactured by applying high stress on the surfaces to be bonded of a plurality of aluminum or aluminum alloy members for hermetically enclosing internally packaged parts so as to cause the extending protruding portion formed on the surface of one of the above members to be inserted into the corresponding extending groove portion formed on the surface of the other of the above member, thus being press-forged, in which the extending groove portion is filled by the extending protruding portion to be jointed and metal-bonded. As a result, since the volume of the groove portion is different from that of the protruding portion, the protruding portion is pressed to enter the groove portion to secure a highly sealing property therebetween.

In addition, the substrate holder of a semiconductor fabrication equipment or a flat panel display fabrication equipment of the present invention is manufactured by the steps of forming an enclosing groove portion on the surface to be bonded of one of a plurality of the aluminum or aluminum alloy material members for hermetically enclosing internally packaged parts, forming a corresponding enclosing protruding portion on the surface to be bonded of the other of the aluminum or aluminum alloy material members, fitting the above groove portion and the above protruding portion, further forming an extending convex portion outside the enclosing groove portion on the surface of one of the members, and/or outside the enclosing protruding portion on the surface of the other of the members, fitting the convex portion, and press-forging the aluminum or aluminum alloy material members to be metal-bonded. As a result, since the protruding portion is pressed to enter the groove portion, a highly sealing property therebetween is secured, and since the convex portion is pressed to be metal-bonded, a highly secured bonding on the peripheral portion can be obtained, thus enabling to prevent a treating liquid from infiltrating through the peripheral bonded portion.

Furthermore, the substrate holder of a semiconductor fabrication equipment or a flat panel display fabrication equipment of the present invention is manufactured by the steps of forming an enclosing convex portion on the surface to be bonded of one of a plurality of the aluminum or aluminum alloy material members for hermetically enclosing internally packaged parts, forming a corresponding another enclosing convex portion on the surface to be bonded of the other of the aluminum or aluminum alloy material members, and press-forging the enclosing convex portions to be metal-bonded. As a result, a highly sealing property can be obtained.

Furthermore, the substrate holder of a semiconductor fabrication equipment or a flat panel display fabrication equipment of the present invention is manufactured by the steps of forming an enclosing groove portion on the surface to be bonded of one of a plurality of the aluminum or aluminum alloy material members for hermetically enclosing the internally packaged parts, forming a corresponding another enclosing groove portion on the surface to be bonded of the other of the aluminum or aluminum alloy material members, inserting an intermediate aluminum or aluminum alloy material member between the groove portion and the another groove portion and press-forging the groove portion, the intermediate portion and the another groove portion to be metal-bonded. As a result, a highly sealing property can be obtained.

As described above, since the enclosing protruding portion is pressed into the corresponding enclosing groove portion, and furthermore, only the portions to be bonded of the aluminum or aluminum alloy material members are selectively press-forged to be metal-bonded in the present invention, a highly sealing property can be obtained. In addition, since the joint portion is metal-bonded, the hermetically sealed property (highly sealing property) can be maintained when used at such a high temperature as around 500 degree centigrade.

Furthermore, since the substrate holder of a semiconductor fabrication equipment or a flat panel display fabrication equipment of the present invention is formed by an aluminum or aluminum alloy material member, the substrate holder is excellent in corrosion resistance to corrosive gases. For example, when silane gas is employed in fabricating a semiconductor, the substrate holder, chamber or the like is contaminated by silicon included in the silane gas. In order to clean the contamination, a cleaning gas containing fluorine is introduced into the substrate holder or chamber. Since the substrate holder, chamber or the like is formed by an aluminum or aluminum alloy material member as described above, the substrate holder, chamber or the like has corrosion resistance to such a cleaning gas as a gas containing fluorine.

A counter diffusion of impurities occurs in the joint portion within a range of about 10 micron meter to several tens of micron meter between the two material members with the press-forging applied thereto. It is considered that more effective metal bonding is performed by the above counter diffusion. More specifically, it is considered that a high stress is hot-applied (i.e., a high stress is applied during press forging) between the two material members, the counter diffusion of impurities is accelerated during the press-forging to improve the bonding strength.

There are listed as the internally packaged parts of the substrate holder of the semiconductor fabrication equipment or the flat panel display fabrication equipment in the present invention, for example, a heater, a thermocouple, an electrode, different metals, different materials. In the various process steps of fabricating the semiconductor, appropriate inner parts are packaged within the substrate holder to implement a specific function. More specifically, the heater, thermocouple, electrode or the like provides the substrate holder with a specific property.

The different metals or different materials packaged as required provides the substrate holder with such properties as low thermal expansion coefficient, high temperature strength and the like. For example, aluminum matrix composite material with ceramic fiber, ceramic whiskers, carbon fiber or the like dispersed therein lowers the thermal expansion coefficient of the substrate holder, and improves the high temperature strength, stiffness to cause heat distortion not to occur.

The substrate holder of the flat panel display fabrication equipment of the present invention is exemplified as follows: a substrate holder of a equipment for fabricating a liquid crystal display (LCD), plasma display panel (PDP), field emission display (FED), organic EL (electro-luminescence) display (EL), and light emitting diode (LED).

In the method of manufacturing a hermetically sealed chamber of the present invention, the above-mentioned press-forging is carried out by applying a stress of at least a hot flow stress of the aluminum or aluminum alloy material member on the surfaces of the aluminum or aluminum alloy material members to be press-forged at a temperature range of 300 to 500 degree centigrade. The temperature range is preferably within 350 to 500 degree centigrade. When the press-forging is carried out by applying at least a hot flow stress of the material member on the surfaces of the material members to be bonded at the temperature within the above range, the joint portion is metal-bonded, thus a hermetically sealed container can be obtained. It is preferable to apply a higher stress onto the joint portion, in particular, at least two to three times of the hot flow stress of the material member is most preferable. With a temperature of press-forging under 300 degree centigrade, the flow produced in the joint portion is too little for the material members to sufficiently be metal-bonded. On the other hand, with a temperature of press-forging over 500 degree centigrade, the surface oxidization becomes so large or the flow produced in the joint portion members is so large that the product does not have a prescribed dimensional accuracy in the joint portion.

The bonded strength in the portion which was metal-bonded in accordance with the eighth embodiment of the method of the present invention was tested. More specifically, the method comprises the steps of forming an enclosing convex portion on a surface of one of two aluminum or aluminum alloy material members, forming a corresponding another enclosing convex portion on a surface of the other of two aluminum or aluminum alloy material members, fitting thereof, and causing the convex portions to be metal-bonded by press-forging. Samples of the material member to be press-forged are prepared in a bar shape (the surface to be bonded is a regular square of 15 mm×15 mm). Then, a relationship in press-forging between the material members to be bonded, the bonded temperature, and the bonded strength was tested using the above-mentioned samples. The result is shown in the table below.

The press-forging was carried out as follows: fitting the surface to be bonded of one of the bar shaped material member and the surface to be bonded of the other bar shaped material member, and then, press-forging the surface of the one of the material member and the surface of the other material member to cause the surfaces to produce a prescribed flow, while the different kinds of material member are used and the different temperatures of press-forging are employed.

The bonded strength shown in the table is an apparent bonded strength obtained by dividing the breaking load (rupture stress) of the material member by the sectional area of the surface to be bonded when the press-forged material member is pulled outward along normal (vertical) direction against the surface to be bonded.

The material members to be bonded are aluminum or aluminum alloy designated by Japanese Industrial Standards (JIS) described later. More specifically, 1050+1050 represents that the aluminum alloy material member designated by JIS1050 and the aluminum alloy material member designated by JIS1050 are press-forged, and 1050+3003 represents that the aluminum alloy material member designated by JIS1050 and the aluminum alloy material member designated by JIS3003 are press-forged.

| No. | material member to be bonded | temperature (deg. C.) to be bonded | apparent strength bonded (kg/mm2) |
|---|---|---|---|
| 1 | 1050 + 1050 | 200 | not bonded |
| 2 | 1050 + 1050 | 300 | 13.0 |
| 3 | 1050 + 1050 | 350 | 14.0 |
| 4 | 1050 + 1050 | 400 | 14.0 |
| 5 | 1050 + 1050 | 450 | 14.0 |
| 6 | 1050 + 1050 | 500 | 15.0 |
| 7 | 1050 + 3003 | 400 | 16.4 |
| 8 | 3003 + 3003 | 400 | 15.4 |

As is clear from the forgoing, an excellent metal bonding can be obtained by press-forging at the temperature within a range from 300 to 500 degree centigrade. The material members which were metal-bonded at the above temperature range and pulled in the above manner are observed by SEM (scanning electron microscope) to find the detailed state of the rupture. As a result, dimples are observed in the bonded portion, thus it is found that the bonded portion is ruptured in the same manner as a unit body being ruptured to show that the ductile rupture is occurred.

Furthermore, it is found that the apparent bonded strength increases a little as the temperature of bonding becomes higher.

Although the material, and the preparing process of the aluminum or aluminum alloy hermetically enclosing internally packaged parts are not specifically limited, a rolled plate or forged product which has little internal defects is preferable, considering a property of leakage resistance thereof.

JIS1050 having a purity of at least 99.5% is the most preferable aluminum material, considering the corrosion resistance thereof to cleaning gases. Furthermore, the following material can be used: JIS1100 (Si and Fe:1.0 wt %, Cu:0.05 to 0.20 wt %, Mn: up to 0.05 wt %, Zn: up to 0.10 wt %, the balance being Al), JIS3003 (Si: up to 0.6 wt %, Fe: up to 0.7 wt %, Cu: 0.05 to 0.20 wt %, Mn: 1.0 to 1.5 wt %, Zn: up to 0.10 wt %, the balance being Al), JIS6063 (Si:0.20 to 0.6 wt %, Fe: up to 0.35 wt %, Cu: up to 0.10 wt %, Mn: up to 1.0 wt %, Mg: 0.45 to 0.9 wt %, Cr: up to 0.10 w t%, Zn: up to 0.10 wt %, Ti: up to 0.10 wt %, the balance being Al), JIS6061 (Si: 0.40 to 0.8 wt %, Fe: up to 0.7 wt %, Cu: 0.15 to 0.40 wt %, Mn: up to 0.15 wt %, Mg: 0.8 to 1.2 wt %, Cr: 0.04 to 0.35 wt %, Zn: up to 0.25 wt %, Ti: up to 0.15 wt %, the balance being Al), JIS3004 (Si: up to 0.03 wt %, Fe: up to 0.7 wt %, Cu: up to 0.25 wt %, Mn: 1.0 to 1.5 wt %, Mg:0.8 to 1.3 wt %, Zn: up to 0.10 wt %, the balance being Al), and the like. Furthermore, Al-Mg alloy containing a low Mg (magnesium) and the like can be used as far as the alloy satisfy the bonding property so as to be sufficiently metal-bonded.

The aluminum or aluminum alloy material members of the present invention comprise a plurality of material members, for example, two material members. The plurality of material members are to be bonded and internally packaged parts are hermetically enclosed therein.

An extending groove portion is formed on the surface to be bonded of one of the aluminum or aluminum alloy material member. The groove portion extends in a manner to make an enclosure along the peripheral portion of the material member outside the portion in which the internally packaged parts is received. A corresponding extending protruding portion is formed on the surface of the other aluminum or aluminum alloy material member. The protruding portion extends in a manner to make a corresponding enclosure along the peripheral portion of the material member outside the portion in which the internally packaged parts is received.

One set or more than two sets of the enclosing groove portions and protruding portions may be formed. The configuration of the enclosure of the extending groove portion or the extending protruding portion formed on the surface to be bonded of the material member includes rectangle, polygon, and circle.

The enclosing groove portion and the enclosing protruding portion may be formed by means of, for example, machine work.

It is preferable to wash the surface of the groove portion and the protruding portion prior to the press forging as a pretreatment. The surface is washed and cleaned by the following processes appropriately combined: (1) removing grease on the surface with nitric acid, (2) washing with water, (3) applying a chemical conversion treatment (etching with an alkaline solution), (4) washing with water, (5) cleaning with nitric acid, (6) washing with water, (7) washing with hot water, or the like. Thus, each surface of the aluminum or aluminum alloy material members is washed by alkali solution and furthermore by acid solution to be neutralized.

The enclosing protruding portion is inserted into the corresponding enclosing groove portion so as for the two material members to be fitted, then pressing the protruding portion into the groove portion in such manner that the groove portion is filled with the protruding portion, and then further press-forging the two material members to cause the two material members to be metal-bonded. According to the chamber of the present invention, a high gas tightness required for a semiconductor fabrication equipment can be obtained. More specifically, such a highly gas tightness, namely, property of leakage resistance as sustained under a high vacuum degree of 10-8 to 10-10 Torr, can be obtained.

The width of the protruding portion may be a little larger than the width of the groove portion, as far as the protruding portion can be inserted into the groove portion. More specifically, the protruding portion can be pressed into the groove portion when an appropriate force is applied thereon, i.e., in the condition of being fitted by pressing.

The fitted portion of the groove portion and the protruding portion can be most easily bonded when the material member comprises a pure aluminum of at least 99.5% purity. Furthermore, the fitted portion may be bonded when the material member comprises aluminum alloy such as JIS1100 of at least 99.0% purity, JIS3003 of Al-Mn type, JIS3004, JIS6063, JIS6061 or the like.

When a plurality of aluminum or aluminum alloy material members to be metal-bonded comprise the same material, the material members are press-forged to be physically metal-bonded by means of metal flow generated in the press-forging.

However, when a plurality of aluminum or aluminum alloy material members to be metal-bonded comprise different materials, the material members are press-forged to be physically metal-bonded by means of metal flow generated in the press-forging. For example, when aluminum alloys JIS1000 and JIS3000 are used as the different materials, the material members are press-forged to be physically metal-bonded by means of metal flow generated in the press-forging.

The sectional configuration of the groove portion formed on the surface to be bonded of the aluminum or aluminum alloy material member may comprise a square concave (deep), trapezoid, reverse trapezoid or the like. Considering to avoid an air entrapment into the groove portion in the press-forging, the square concave (deep) or trapezoid (widening to the surface) is preferable for the sectional configuration of the groove portion. Furthermore, in order to facilitate the fitting of the protruding portion to the groove portion, the tip portion of the corresponding square convex shaped protruding portion may be appropriately cut in a chamfering manner.

For example, the enclosing groove portion having a sectional configuration of a square concave comprising the width (a) and the depth (b), is combined with the enclosing protruding portion having a sectional configuration of the corresponding square protruding portion comprising the width (c) and the height (d). The enclosing groove portion can be effectively filled with the corresponding enclosing protruding portion by press-forging so as to be desirably metal-bonded and sealed, when the following formulae are satisfied:

$$a \times b \leqq c \times d,\ b/d \leqq 1.0$$

The reason thereof is as follows: When the cross sectional area of the protruding portion is larger than the cross sectional area of the groove portion, the part of the material member which corresponds to the excess cross sectional area of the protruding portion is pressed into the groove portion. Accordingly, a high pressure is applied onto the surface to be bonded in such a manner to widen the cross sectional area of the groove portion, thus increasing the bonding power of the material members.

It is possible to insert the enclosing protruding portion having a sectional configuration of square convex into the corresponding enclosing groove portion having a corresponding sectional configuration of square concave even if the width of the groove portion is slightly larger than the width of the protruding portion, however, it is preferable that the width of the groove portion is smaller than the width of the protruding portion, considering the air entrapment into the groove portion in the press-forging. Furthermore, it is preferable that the depth of the groove portion is larger than the height of the protruding portion, when the enclosing protruding portion having a sectional configuration of square convex -into the corresponding enclosing groove portion having a corresponding sectional configuration of square concave so as to be metal-bonded and sealed.

The enclosing convex portion formed on the surface to be bonded of the aluminum or aluminum alloy material member is formed outside the extending groove portion of one of two aluminum or aluminum alloy material members, and/or outside the extending protruding portion of the other of two other aluminum or aluminum alloy material members, which convex portion extends in a manner to make an enclosure. The height of the above convex portion is smaller than that of the protruding portion. Thus, when press-forged, metal flow is generated so as to make the same flat surface as the surface to be bonded, leading to be firmly metal-bonded.

Furthermore, when only the extending convex portion is formed so as to extend in a manner to make an enclosure on the surface to be bonded without forming the groove portion and the protruding portion, and press-forged, metal flow is generated so as to make the same flat surface as the surface to be bonded, leading to be physically metal-bonded.

The chamber of the present invention for the semiconductor fabrication equipment may be manufactured by the same method as that for manufacturing the above-mentioned substrate holder of the semiconductor fabrication equipment or the flat panel display fabrication equipment. More specifically, the method comprises the steps of:

- preparing a plurality of aluminum or aluminum alloy material members;
- forming on the surface to be bonded of the material member the following portions as (1) the enclosing groove portion and the corresponding protruding portion, (2) the enclosing groove portion and the corresponding protruding portion in addition, the enclosing convex portion outside the groove portion and/or outside the protruding portion, (3) the enclosing convex portion and the corresponding convex portion, or (4) the enclosing groove portion, the intermediate portion, and the corresponding another groove portion;
- fitting the surfaces to be bonded;
- press-forging the material members to be physically metal-bonded through flowing of the material members.

The equipment which treats such a device in vacuum as the semiconductor device includes a process chamber, a transfer chamber and a load/unload chamber. The process chamber comprises three chambers A, B and C, each of which is used for the respective fabrication process. The transfer chamber is a chamber in which such materials as liquid crystals, wafers or the like is transferred between the process chambers. For example, the material such as wafers processed in the process chamber A is firstly transferred to the transfer chamber by such a transfer system as a transfer robot, and then, is transferred to the process chamber B. The load/unload chamber is a chamber in which wafers or the like are loaded from outside of the equipment to the transfer chamber or unloaded from the transfer chamber to outside of the equipment. Each of the chamber has a window for loading/unloading the material, and a upper cover which is opened for its maintenance.

The above-mentioned process chamber, transfer chamber and load/unload chamber are the chambers for semiconductor fabrication equipment. The bottom plate and the side plate of the chamber may be press-forged to be metal-bonded according to the method of the present invention.

Furthermore, a hermetically sealed container for an industrial waste of the present invention may be manufactured by the same method as that for manufacturing the substrate holder of the above-mentioned semiconductor fabrication equipment or the flat panel display fabrication equipment. More specifically, the bottom plate and the side plate thereof are press-forged to be metal-bonded according to the method of the present invention.

EXAMPLE

Example 1

Figure 2:
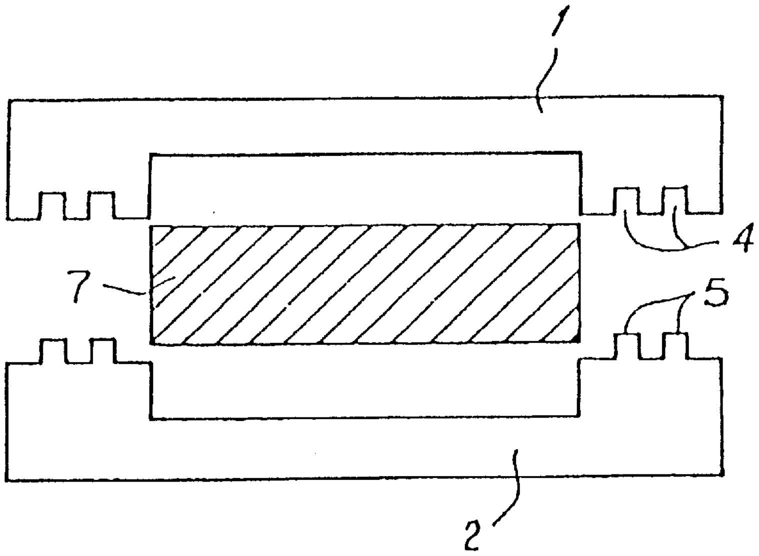
FIG. 2(*a*) to FIG. 3(*c*) are schematic view representing one of the steps of manufacturing a substrate holder of the present invention.
Figure 2:
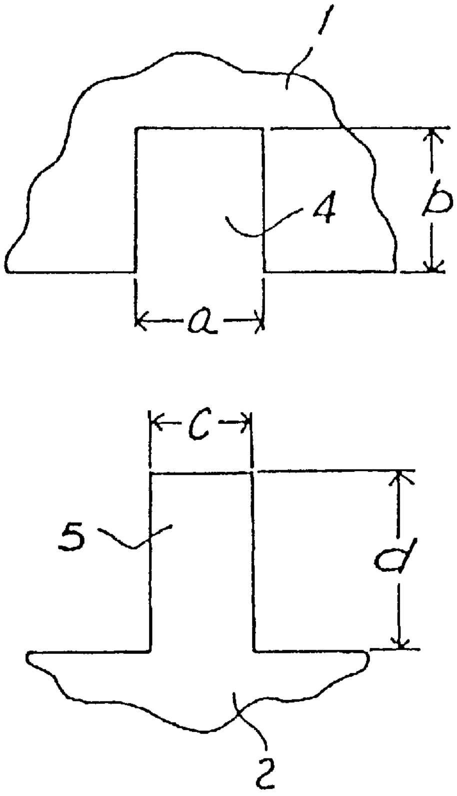
Figure 3:
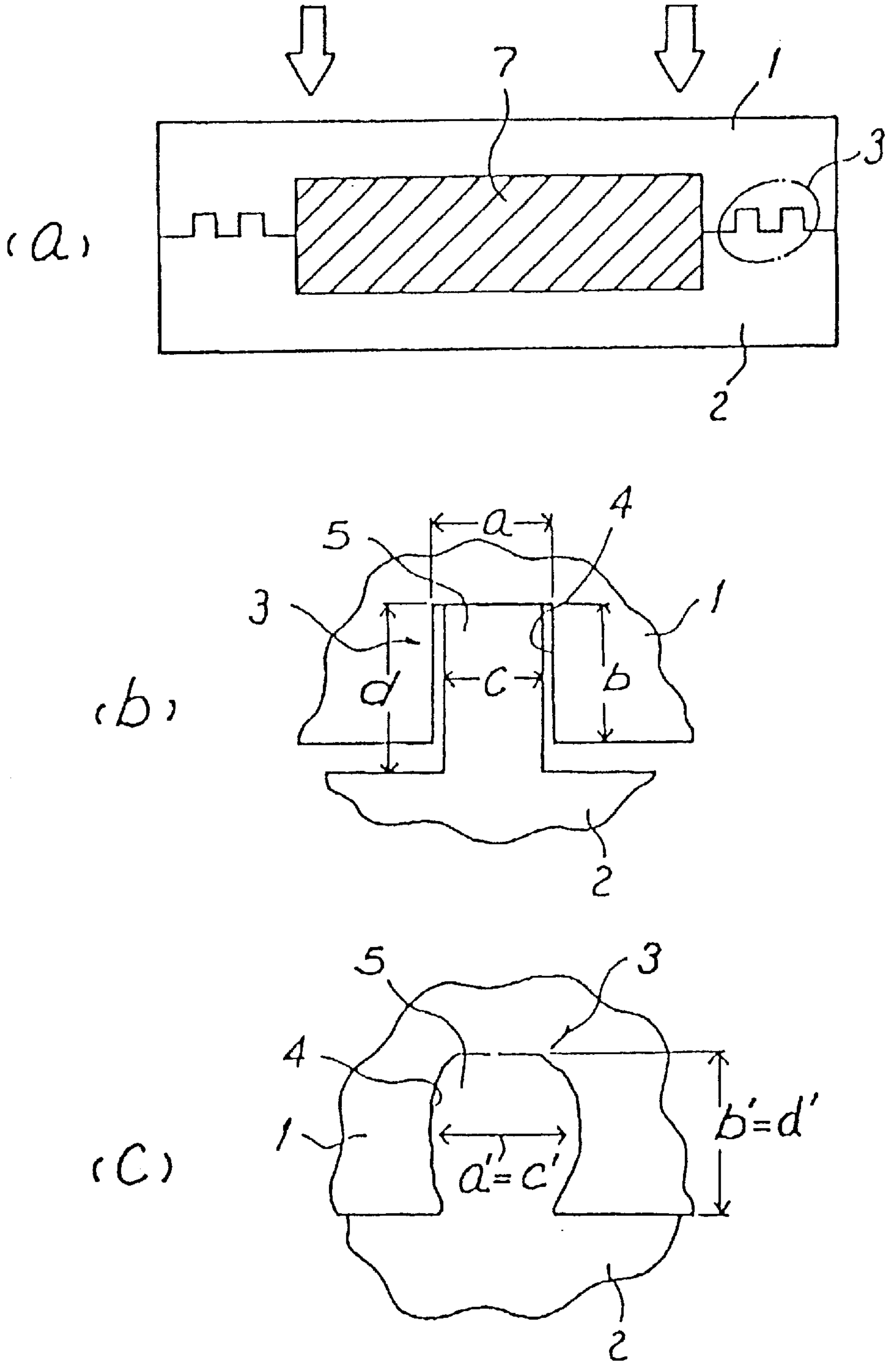

The present invention is described in more detail by the example 1 with reference to FIGS. 1 to 3.

FIG. 1 is a schematic view of a substrate holder of a semiconductor fabrication equipment or a flat panel display fabrication equipment of the present invention disposed in the chamber of the example 1. FIG. 1(*a*) is a schematic side sectional view thereof, and FIG. 1(*b*) is a schematic plane sectional view thereof. The substrate holder is formed by bonding the aluminum material members (1), (2) in which the internally packaged parts such as a heater and thermocouple (7), different metals or different materials (8) are hermetically enclosed. At the lower portion of the substrate holder, there is provided a terminal (9) of the heater and thermocouple. The substrate holder is disposed within the chamber (10), as shown in FIG. 1. On the surfaces to be bonded of the aluminum material members (1), (2), there are formed rectangularly extended groove portion and the corresponding protruding portion, which extend to make a rectangular enclosure, respectively. The protruding portion is inserted into the groove portion, then the groove portion is filled with the protruding portion by press-forging, and then the material members are further pressed to cause metal flaw to be generated, thus the joint portion (3) where the metal flow is thus generated is sealed and the surfaces to be bonded of the aluminum material members (1), (2) are physically metal-bonded. The temperature of the press-forging was 400 degree centigrade, and the stress applied onto the surfaces to be press-forged was 30 kg/mm2. The thus formed substrate holder was disposed within the chamber.

FIG. 2(*a*), FIG. 2(*b*), FIG. 3(*a*), FIG. 3(*b*) and FIG. 3(*c*) are schematic view representing the processes for manufacturing a substrate holder of the present invention.

As shown in FIG. 2(*a*), there is formed in the aluminum material members (1), (2) a recess portion to receive the internally packaged parts such as a heater, a thermocouple or the like.

Two enclosing groove portions (4) having a square concave sectional configuration are formed on the surface to be bonded of the aluminum material member (1), and two corresponding enclosing protruding portions (5) having the corresponding square protruding sectional configuration are formed on the surface to be bonded of the aluminum material member (2). FIG. 2(*b*) shows the enlarged groove portion (4) having the width (a) and the depth (b) as well as the enlarged protruding portion (5) having the width (c) and depth (d).

Then, as shown in FIG. 3(*a*), the internally packaged parts (7) is received in the aluminum material members (1),(2) and the protruding portion (5) and the groove portion (4) are fitted.

FIG. 3(*b*) shows the enlarged view of the fitted protruding portion (5) and the groove portion (4), in which the protruding portion (5) having the width (c) is inserted into the groove portion (4) having the width (a), and the height (d) of the protruding portion (5) is larger than the depth (b) of the groove portion (4).

The protruding portion (5) is inserted into the groove portion (4) and thus fitted, and then press-forged in a manner as shown in FIG. 3(*a*) by arrows. As the result of the press forging, as shown in FIG. 3(*c*), it turns out that a'=c', and b'=d. More specifically, the protruding portion (5) is compressed within the groove portion (4) in such manner that the groove portion is enlarged and fully filled with the protruding portion, resulting in that the width (a), width (c) become width (a'), width (c'), respectively, and the depth (b), height (d) become depth (b'), height (d'), respectively. As a result, the joint portion is sealed.

When press-forged, the entire material members are compressed along the width thereof, as a result, the joint portion of the material members is effectively metal-bonded, and hermetically sealed.

The relationship between the groove portion (4) and the protruding portion (5) is described with reference to FIG. 2(*b*).

When the groove portion has the width of (a) and the depth of (b), while the protruding portion has the width of (c) and the height of (d), it is preferable to satisfy the following formulae:

$a \times b \leqq c \times d$ $b/d \leqq 1.0$ $d/c \leqq 6$ (preferably $d/c \leqq 4$)

When the formulae of $a \times b \leqq c \times d$, $b/d \leqq 1.0$ are satisfied, the protruding portion (5) is effectively pressed into the groove portion (5) by press-forging so as for the joint portion to be sealed.

Since the length of the enclosing protruding portion is the same as that of the enclosing groove portion, when the sectional area (axb) of the groove portion is larger than the sectional area (cxd) of the protruding portion, the volume of the enclosing groove portion is larger than that of the enclosing protruding portion, resulting in that the groove portion is not fully filled with the protruding portion when press-forged. Accordingly, in order to obtain a hermetically sealed substrate holder, it is preferable that the formula of $a \times b \leqq c \times d$ should be satisfied.

When the width (c) of the protruding portion (5) is excessively smaller than the width (a) of the groove portion (4), the groove portion (4) cannot be fully filled with the protruding portion (5) by press forging, resulting in poor bonding so as not to be hermetically sealed.

Practically, the material members (1), (2) comprising pure aluminum having purity of at least 99.5% are prepared, the groove portion having the width (a) of 7.0 mm, the depth (b) of 7.0 mm is formed, and the protruding portion having the width (c) of 6.9 mm, the height (d) of 9.0 mm is formed, and then the protruding portion (5) is compressed and filled into the groove portion (4) by press forging. Thus manufactured substrate holder was hermetically sealed, resulting in no leakage under the high vacuum of $10^{-8}$ to $10^{-10}$ Torr.

When the width (c) of the protruding portion (5) is excessively smaller than the width (a) of the groove portion (4), the buckling is generated in the protruding portion when press-forged, so that the groove portion (4) cannot be fully filled with the protruding portion (5), resulting in poor bonding so as not to be hermetically sealed.

Figure 5:
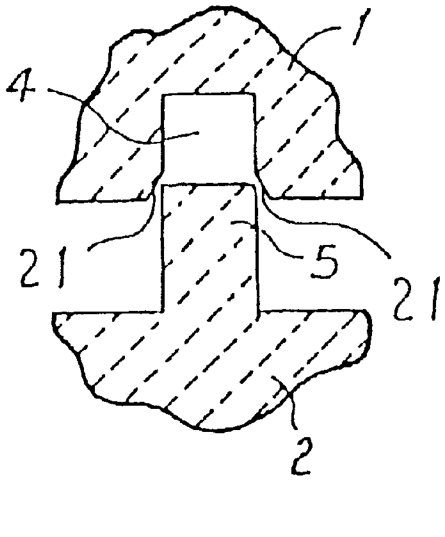
Figure 6:
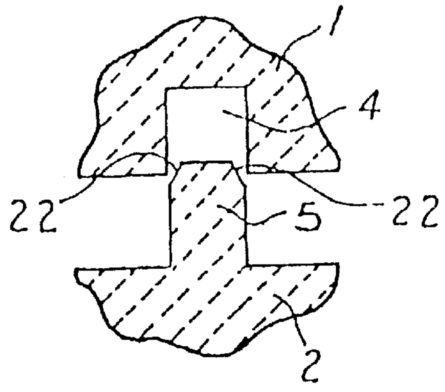

Other examples of the groove portion (4) and the protruding portion (5) are described with reference to FIGS. 4 to 6 .

Figure 4:
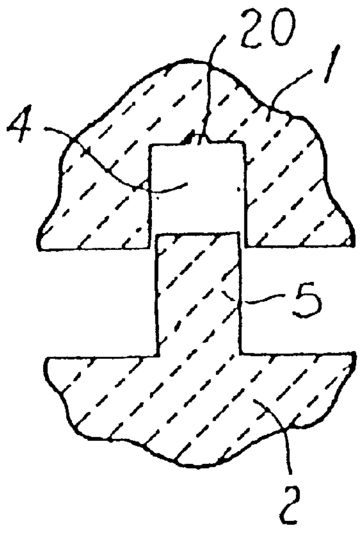
FIG. 4 to FIG. 9 are schematic view representing an extending groove portion and an extending protruding portion of the first embodiment of the chamber of the present invention.

As shown in FIG. 4, an air enclave (20) is formed in the groove portion (4) in order to prevent the air from being entrapped during press forging. As shown in FIG. 5, the corner portion (21) of the groove portion (4) is cut in a chamfering manner in order to facilitate the fitting of the protruding portion (5) to the groove portion (4). As shown in FIG. 6, the corner portion (22) of the protruding portion (5) is cut in a chamfering manner in order to facilitate the fitting of the protruding portion (5) to the groove portion (4).

Further other examples of the groove portion and the protruding portion are described with reference to FIGS. 7 to 9 .

Figure 7:
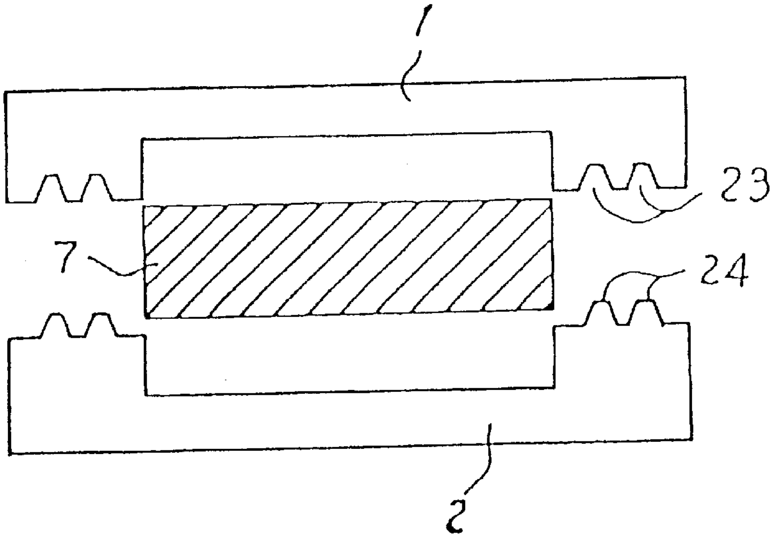
Figure 7:
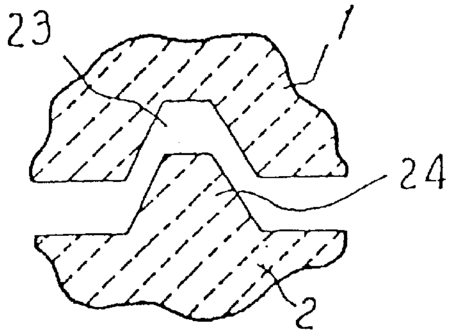

As shown in FIGS. 7(*a*) and (*b*), the groove portion (23) having a sectional area of a trapezoidal configuration is formed on the surface to be bonded of the aluminum material member (1), and the corresponding protruding portion (24) having a sectional area of the corresponding trapezoidal configuration is formed on the surface to be bonded of the aluminum material member (2). The scale of the trapezoidal groove portion (23) and the trapezoidal protruding portion (24) are such that the groove portion is fully filled with the protruding portion by press forging. The groove portion and the protruding portion are easily formed by machine working, and no air entrapment is generated during the press forging.

Figure 8:
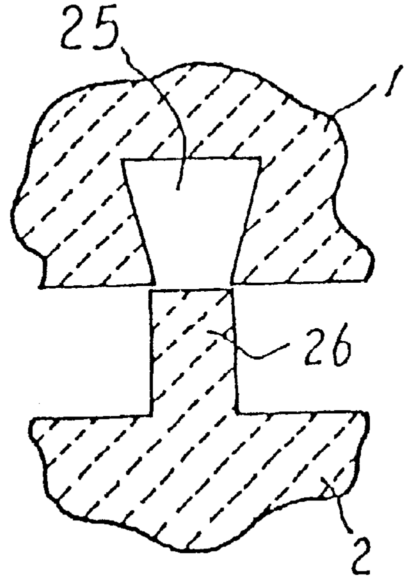

As shown in FIG. 8, the groove portion (25) has a sectional area of a reverse trapezoidal configuration, and the protruding portion has a sectional area of a square protruding configuration. According to this embodiment, when the groove portion and the protruding portion are fitted and metal-bonded by press forging, a hermetical tightness can be obtained, in addition to a strong mechanical bonding.

Figure 9:
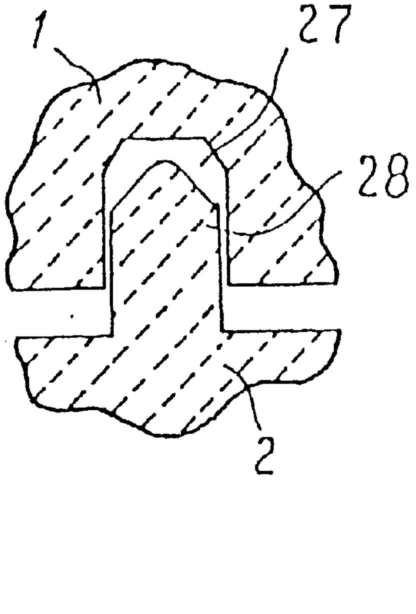

As shown in FIG. 9, the groove portion (27) has a specific corner at the bottom thereof, and the corner portion of the protruding portion (28) are correspondingly cut so as to facilitate the fitting of the protruding portion (28) to the groove portion (27).

Example 2

Figure 10:
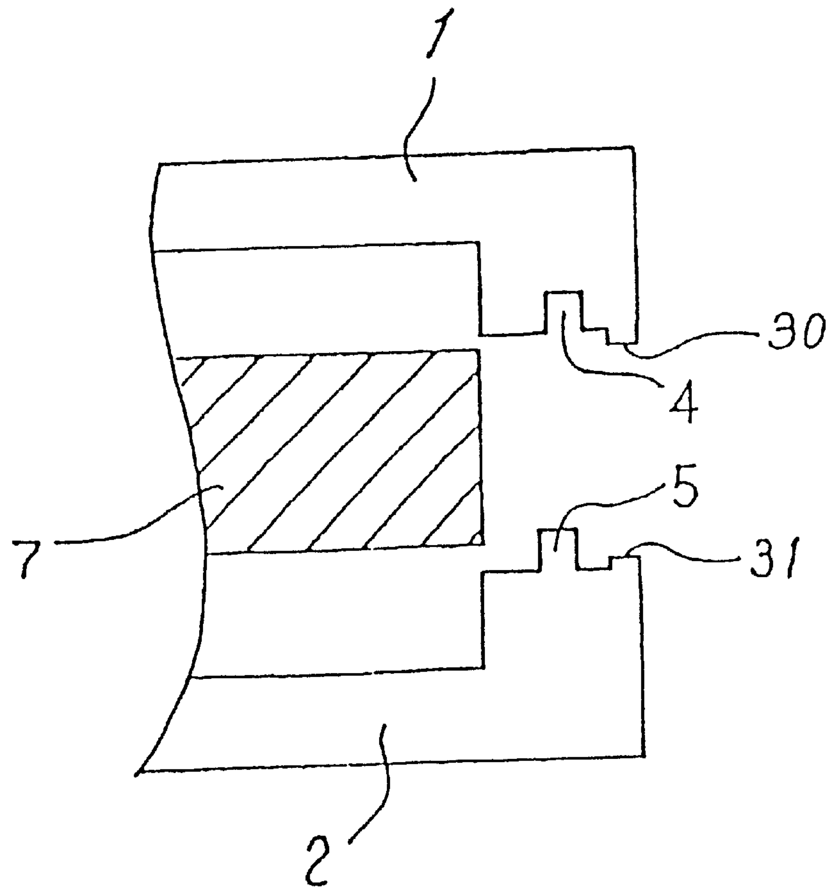
FIG. 10 is a schematic view representing the seventh embodiment of the chamber of the present invention.
Figure 11:
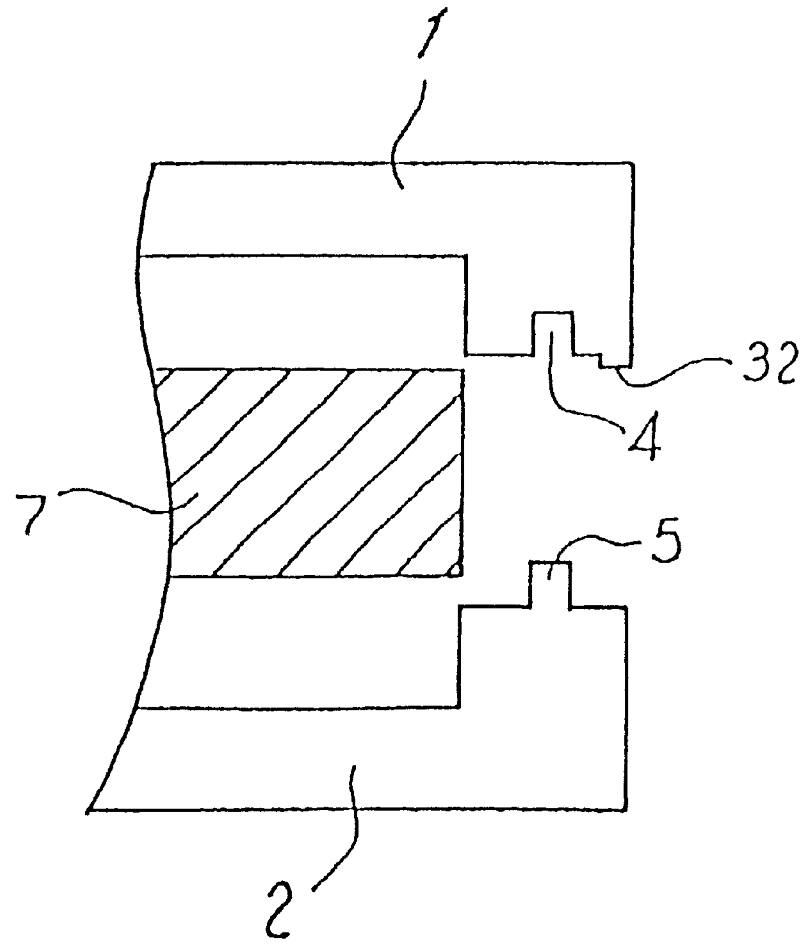
FIG. 11 is a schematic view representing the seventh embodiment of the chamber of the present invention.

The present invention is described in more detail by the example 2 with reference to FIGS. 10 and 11.

FIGS. 10 and 11 show a part of the aluminum material members of the substrate holder of the semiconductor fabrication equipment or the flat panel display fabrication equipment, before the press forging is performed.

As shown in FIG. 10, a recessed portion is formed on the respective aluminum material members (1), (2) to receive such internally packaged parts as a heater and a thermocouple or the like.

There are formed on the aluminum material member (1), the enclosing groove portion (4) having a square concave sectional configuration and the enclosing convex portion (30). There are formed on the aluminum material member (2), the enclosing protruding portion (5) having the corresponding square convex sectional configuration and the corresponding enclosing convex portion (31).

The groove portion (4) and the protruding portion (5) are formed in the same manner as described in the example 1 .

Since the height of the convex portions (30),(31) are lower than that of the protruding portion (5), the convex portions (30),(31) are compressed to be flat on the surface to be bonded by press forging.

The enclosing protruding portion (5) is fitted and inserted into the enclosing groove portion (4), while the enclosing convex portions (30), (31) are fitted, and then press-forged. The groove portion is fully filled with the protruding portion by compressing and press forging. As a result, the joint portion is tightly sealed.

When press-forged, the entire material members are compressed along the width thereof, as a result, the convex portions (30), (31) are compressed and effectively metal-bonded, thus the peripheral portion is also gas-tightly sealed.

Practically, the material members (1), (2) comprising pure aluminum having purity of at least 99.5% are prepared, the groove portion (4) having the width (a) of 7.0 mm, the depth (b) of 7.0 mm is formed, and the protruding portion (5) having the width (c) of 6.9 mm, the height (d) of 9.0 mm is formed, The convex portions (30), (31) having the height of 4 mm, the width of 10 mm are formed, and then the protruding portion (5) is compressed and filled into the groove portion (4) by press forging, while the convex portions (30), (31) are compressed and press-forged to be flat on the surfaces to be bonded. The temperature of press forging was 400 degree centigrade, and the stress applied on the press-forged surfaces was 30 kg/mm$^2$. Thus manufactured substrate holder was hermetically sealed, resulting in no leakage under the high vacuum of $10^{-8}$ to $10^{-10}$ Torr. Furthermore, the processing liquid was prevented from infiltrating through the peripheral bonded portion into the holder.

As shown in FIG. 11, there is formed in the aluminum material members (1), (2) a recessed portion to receive the internally packaged parts (7) such as a heater, a thermocouple or the like. The enclosing groove portion (4) having a square concave sectional configuration and the enclosing convex portion (32) are formed on the surface to be bonded of the aluminum material member (1), and the corresponding enclosing protruding portion (5) having the corresponding square protruding sectional configuration is formed on the surface to be bonded of the aluminum material member (2). More specifically, the enclosing convex portion is not formed on the aluminum material member (2).

The protruding portion (5) is inserted into the groove portion (4), and thus fitted together with the convex portion (32), and then press-forged so that the protruding portion is compressed and fully fills the groove portion, thus the joint portion is metal-bonded and hermetically sealed. When press-forged, the entire material members are compressed along the width thereof, as a result, the convex portion (32) is effectively metal-bonded, and hermetically sealed, thus obtaining the hermetically bonded peripheral portion.

Example 3

Figure 12:
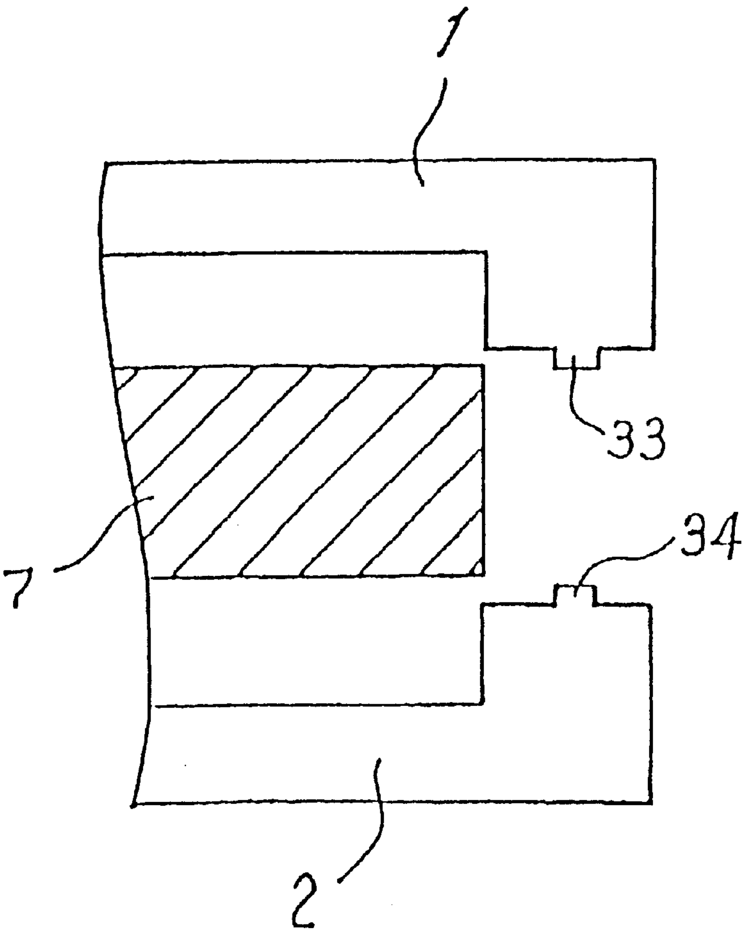
FIG. 12 is a schematic view representing the eighth embodiment of the chamber of the present invention.

The present invention is described in more detail by the example 3 with reference to FIG. 12.

FIG. 12 shows a part of the aluminum material members of the substrate holder of the semiconductor fabrication equipment or the flat panel display fabrication equipment, before the press forging is performed.

As shown in FIG. 12, a recessed portion is formed on the respective aluminum material members (1), (2) to receive such internally packaged parts as a heater and a thermocouple or the like. There is formed on the aluminum material member (1) the enclosing convex portion (33). There is formed on the aluminum material member (2) the corresponding enclosing convex portion (34).

The enclosing convex portion (33) and the corresponding convex portion (34) are fitted and press-forged. When press-forged, the entire material members are compressed along the width thereof. As a result, the convex portion (33) and the convex portion (34) are compressed, metal-bonded, and hermetically sealed. The temperature of press forging was 400 degree centigrade, and the stress applied on the press-forged surfaces was 30 kg/mm$^2$.

Example 4

Figure 13:
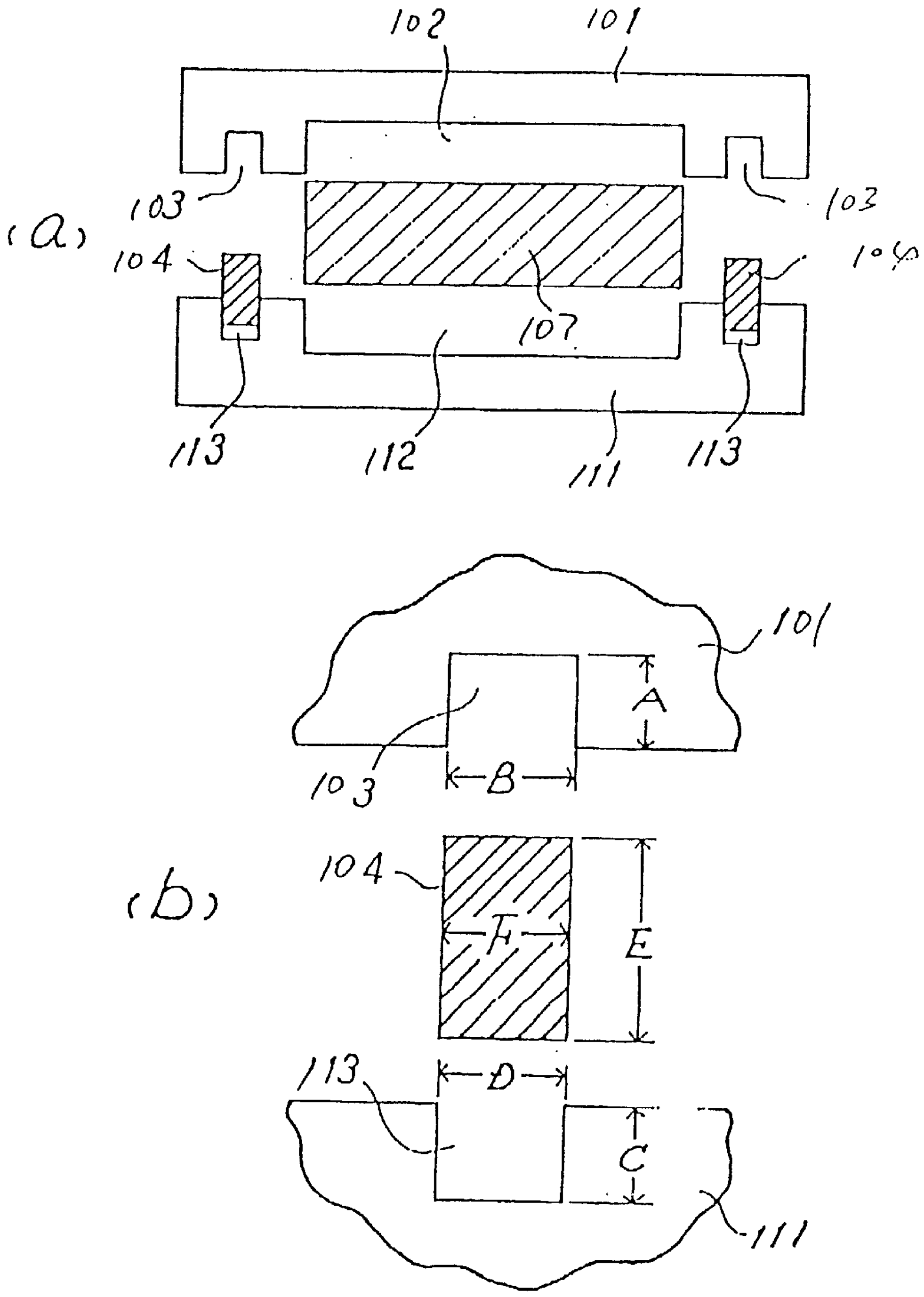
FIG. 13 is a schematic view representing the ninth embodiment of the chamber of the present invention.
Figure 14:
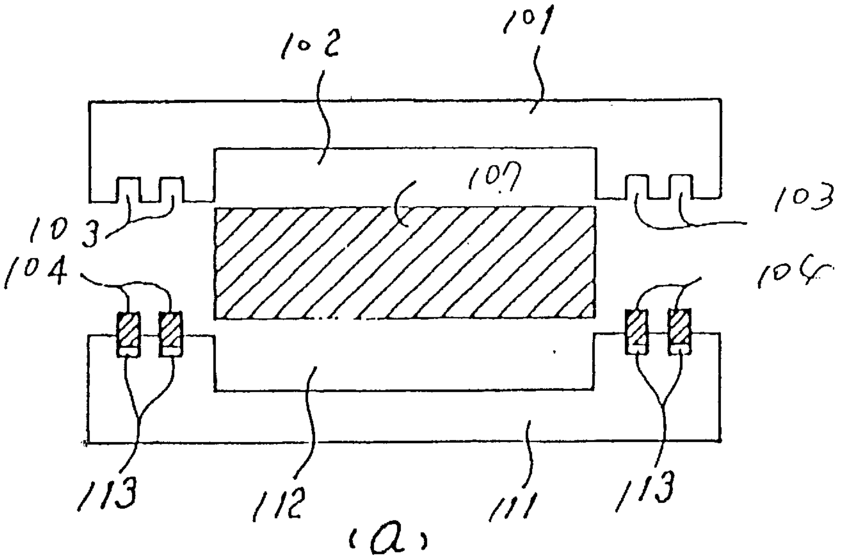
FIG. 14 is a schematic view representing ninth embodiment of the chamber of the present invention.
Figure 14:
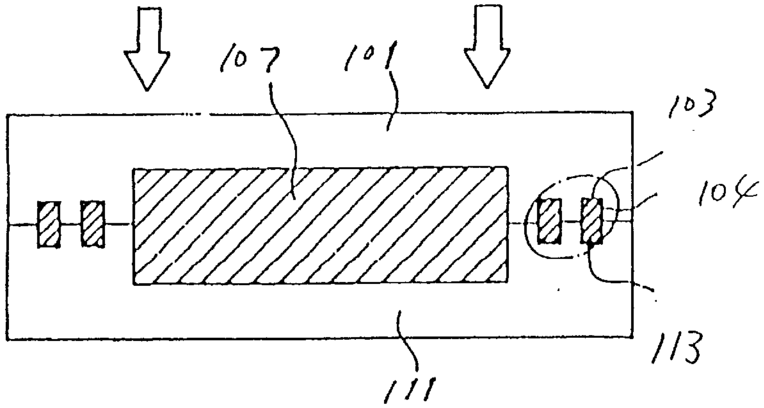
Figure 15:
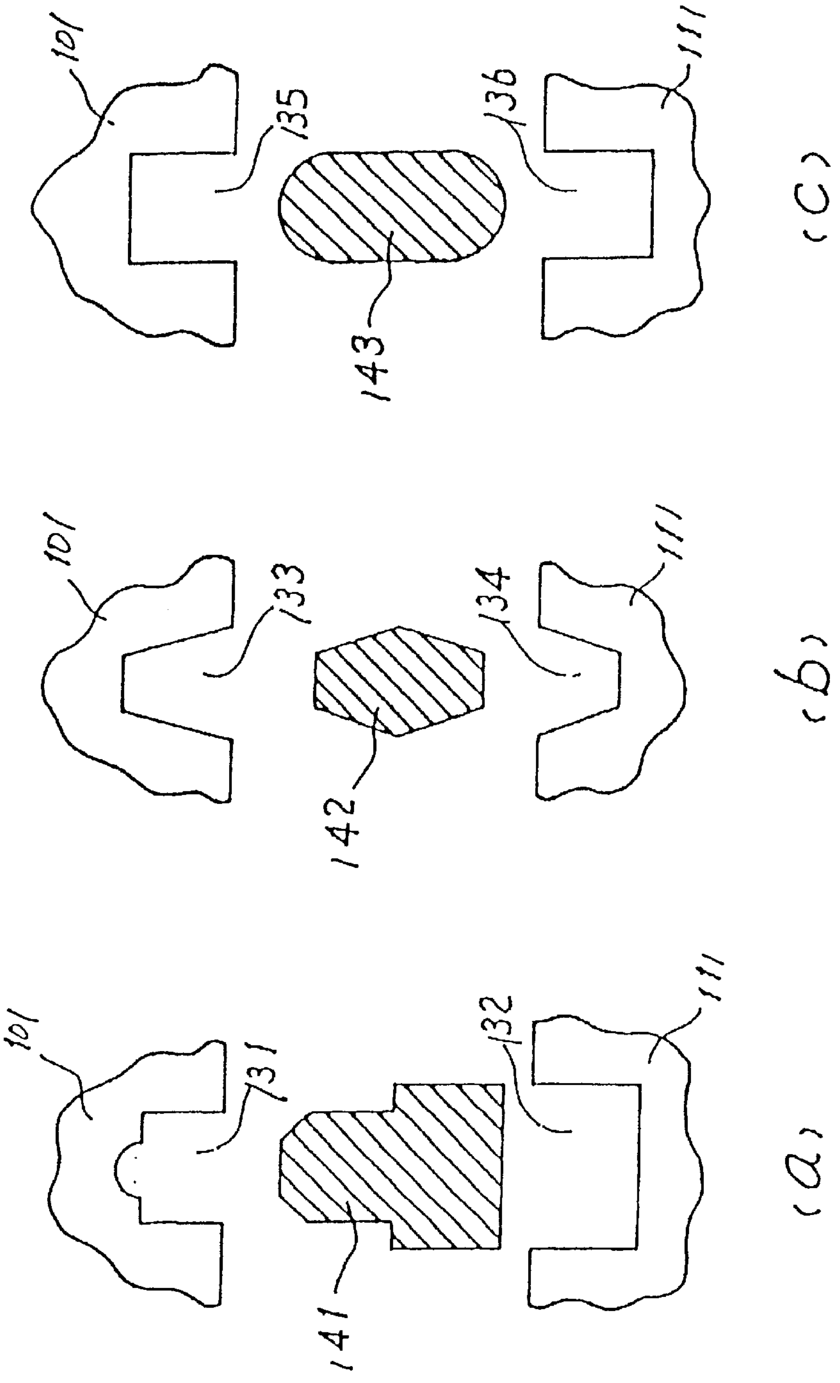
FIG. 15 is a schematic view representing the ninth embodiment of the chamber of the present invention.
Figure 16:
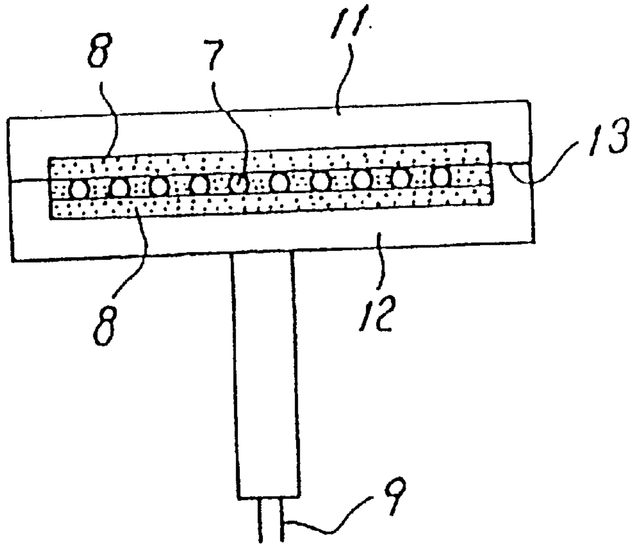
FIG. 16 is a schematic view representing a conventional substrate holder of a semiconductor fabrication equipment.
Figure 17:
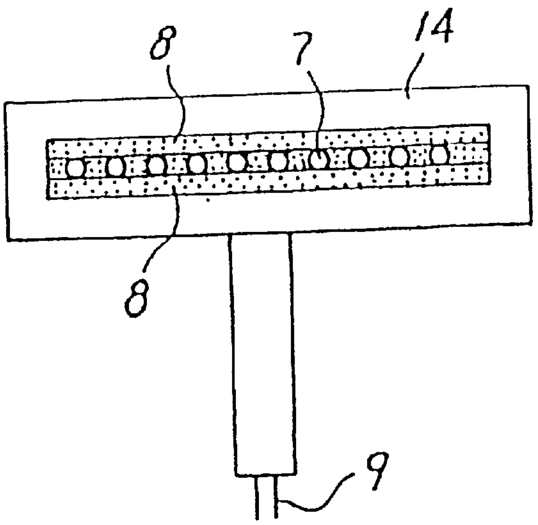
FIG. 17 is a schematic view representing another conventional substrate holder of a semiconductor fabrication equipment.
Figure 18:
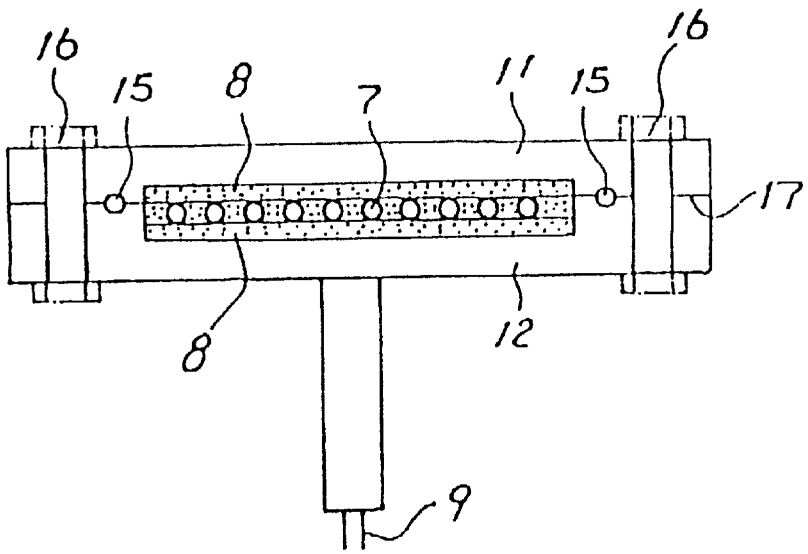
FIG. 18 is a schematic view representing a further another conventional substrate holder of a semiconductor fabrication equipment.

The present invention is described in more detail by the example 4 with reference to FIGS. 13 to 15.

FIGS. 13(*a*), 13(*b*) show a manufacturing process of the substrate holder of the present invention. As shown in FIG. 13(*a*), the space (102) to receive the internally packaged parts (107) such as a heater and a thermocouple or the like is formed in the aluminum material member (101), and the space (112) to receive the internally packaged parts (107) is formed in the aluminum material member (101). The internally packaged parts (107) is hermetically enclosed by the aluminum material members.

There is formed on the surface to be bonded of the aluminum material member (101) the enclosing groove portion (103) having a square concave sectional configuration. There is formed on the surface to be bonded of the aluminum material member (111) the corresponding enclosing groove portion (113) having the corresponding square concave sectional configuration. The intermediate member (104) is inserted into the groove portion (113) of the aluminum material member (111) and fitted, and then, the aluminum material member (111) with the intermediate member thus fitted and aluminum material member (101) are press-forged to be metal-bonded.

FIG. 13(*b*) shows the enlarged view of the groove portions (103), (113) and the intermediate member (104), which shows the practical relationship between the groove portions and the intermediate portion, in which the groove portion (103) has the depth (A), width (B), the groove portion (113) has the depth (C), width (D), and the intermediate member (104) has the length (E), width (F).

When the following formulae are satisfied on press forging the material member (101) and the material member (111), the substrate holder is effectively metal-bonded, and hermetically sealed:

$(A+B)\leqq E,$ $(A\times B+C\times D)\leqq E\times F,$ $(A+C)/E \leqq 1,$ $B\geqq F,$ $D\geqq F$ Practically, the material members (101), (111) and intermediate member (104) comprising pure aluminum having purity of at least 99.5% are prepared. The groove portion (103) having the width (B) of 7 mm, the depth (A) of 5 mm is formed. The groove portion (113) having the width (D) of 7 mm, the depth (C) of 5 mm is formed. The intermediate member having the length (E) of 12 mm, width (F) of 6.8 mm is formed. Then, the material members (101), (111) and intermediate member (104) are press-forged, and the intermediate member (104) fully fills the groove portions (103), (113). The temperature of press forging was 400 degree centigrade, and the stress applied on the press-forged surfaces was 30 kg/mm$^2$. Thus manufactured substrate holder was hermetically sealed, resulting in no leakage under the high vacuum of $10^{-8}$ to $10^{-10}$ Torr.

As shown in FIG. 14(*a*), the space (102) to receive the internally packaged parts (107) such as a heater and a thermocouple or the like is formed in the aluminum material member (101), and the space (112) to receive the internally packaged parts (107) is formed in the aluminum material member (111). The internally packaged parts (107) is hermetically enclosed by the aluminum material members.

There are formed on the surface to be bonded of the aluminum material member (101) two enclosing groove portions (103) having a square concave sectional configuration. There are formed on the surface to be bonded of the aluminum material member (111) two corresponding enclosing groove portions (113) having the corresponding square concave sectional configuration.

Two intermediate members (104) are inserted into the respective groove portions (113) of the aluminum material member (111) and fitted, and then, the aluminum material member (111) with two intermediate member thus fitted and aluminum material member (101) are press-forged in such manner as shown by the arrows in FIG. 14(*b*) to be metal-bonded. The internally packaged parts (107) is hermetically enclosed by the aluminum material members (101), (111), thus the substrate holder of the semiconductor fabrication equipment is manufactured.

In FIG. 14(*a*) a part of the intermediate member (104) is inserted into the groove portion (113), and then press-forged, however, the intermediate member (104) may be fully inserted into the groove portion, and then press forging may be performed.

FIGS. 15(*a*), (b), (c) show examples of the combination of the various configuration of the intermediate members, and groove portions formed on the surfaces to be bonded of the aluminum material members (101), (111).

In FIG. 15(*a*), the groove portion (131) has a square concave sectional configuration, and the recessed portion is formed at its center portion. The groove portion (132) has a wide square concave sectional configuration. The intermediate member comprises a convex portion and a wide width portion which corresponds to the configuration of the respective groove portions. The upper corner portions are cut as shown in FIG. 15(*a*).

In this embodiment, the wide groove portion (132) is easily formed by machine working. Furthermore, since the upper corner portions are cut, the intermediate member (141) can be easily inserted into the groove portion (131). In addition, since the recessed portion is formed in the groove portion (131), no air entrapment is generated during the press forging.

In FIG. 15(*b*), the groove portion (133) of the material member (101) has a trapezoidal concave sectional configuration, and the groove portion (134) of the material member (111) has also a corresponding trapezoidal concave sectional configuration. The intermediate member has the trapezoidal convex sectional configuration which corresponds to the respective trapezoidal concave sectional configuration of the groove portions (133),(134).

In this embodiment, since the groove portions (133), (134) have trapezoidal sectional configurations, the intermediate member is easily inserted into the groove portions (133),(134).

In FIG. 15(*c*), both of the groove portions (135),(136) of the material members (101),(111) have square concave sectional configuration, while the intermediate member (143) has round portions as shown in FIG. 15(*c*). In this embodiment, since the intermediate member (143) has round portions at its end, the intermediate member (143) is easily inserted into the groove portions (135),(136).

As is described above, according to the present invention, the enclosing protruding portion is inserted into the corresponding enclosing groove portion and thus fitted material members are press-forged to be hermetically sealed. More specifically, the joint portion is sealed by press forging in such manner that the bonded portion is physically metal-bonded, thus no pin hole is produced, and the hermetical tightness is maintained under high vacuum degree. Furthermore, material members are metal-bonded, the high gas tightness may be maintained even used at such a high temperature as about 500 degree centigrade. In addition, since the groove portion and the protruding portion are formed by machine working and press-forged, a chamber for manufacturing semiconductor, a substrate holder of the semiconductor fabrication equipment or the flat panel display fabrication equipment and a container for industrial waste can be obtained at lower cost in which the joint portion is metal-bonded, resulting in no pressure leakage.

Since in the present invention, molten aluminum or aluminum alloy is not used contrary to the prior art, the parts and material members packaged in the substrate holder are not exposed against the molten metal. Furthermore, since the space for the bolting is not required, and the groove for the O-ring which is formed by highly precision working is not required to be formed in the present invention, the chamber, or the substrate holder can be manufactured at lower cost.

Furthermore, in addition to the groove portion and the corresponding protruding portion, an enclosing convex portion is further formed outside the groove portion of the material member, and/or outside the protruding portion of the other material member, and the members are fitted and press-forged, the protruding portion is pressed into the groove portion, while securing the hermetically sealed bonding at the peripheral portion, thus enabling to prevent a treating liquid from infiltrating through the peripheral bonded portion.

What is claimed is:

1. A method of manufacturing a hermetically sealed chamber, which comprises the steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding another extending groove portions on a surface to be metal-bonded of the other of said two aluminum or aluminum alloy material members, which another extending groove portion extends in a manner to make a corresponding enclosure;

(d) receiving internally packaged parts there between, and inserting at least one intermediate aluminum or aluminum alloy material bodies between said at least one extending groove portions and said at least one another extending groove portions; and (e) fitting said at least one extending groove portions, said at least one another extending groove portions and said at least one intermediate aluminum or aluminum alloy material members, and causing said at least one extending groove portions, said at least one intermediate material portions, and said at least one another extending groove portions to be metal-bonded by press-forging.

2. The method of manufacturing a hermetically sealed chamber as claimed in claim 1, wherein in preparing said aluminum or aluminum alloy material members, each surface of said aluminum or aluminum alloy material members is washed by alkali and acid solution to be neutralized.

3. The method of manufacturing a hermetically sealed chamber as claimed in claim 1, wherein said press-forging is carried out by applying a stress of at least a hot flow stress of said aluminum or aluminum alloy material member on said surfaces of said aluminum or aluminum alloy material members to be press-forged at a temperature within a range of 300 to 500 degrees centigrade.

4. The method of manufacturing a hermetically sealed chamber as claimed in claims 1, wherein said aluminum or aluminum alloy material members receiving the internally packaged parts comprise the same materials.

5. The method of manufacturing a hermetically sealed chamber as claimed in claim 1, wherein said aluminum or aluminum alloy material members receiving the internally packaged parts comprise different materials.

6. The method of manufacturing a hermetically sealed chamber as claimed in claim 1, wherein said chamber comprises a substrate holder of a semiconductor fabrication equipment or a flat panel display fabrication equipment encasing said internally packed parts.

7. A hermetically sealed aluminum or aluminum alloy chamber, hermetically enclosing internally packaged parts, which is manufactured by the steps of:

(a) preparing two aluminum or aluminum alloy material members which face each other;

(b) forming at least one extending groove portions on a surface to be metal-bonded of one of said two aluminum or aluminum alloy material members, which groove portion extends in a manner to make an enclosure;

(c) forming at least one corresponding another extending groove portions on a surface to be metal-bonded of the other of said two aluminum or aluminum alloy material members, which groove portion extends in a manner to make a corresponding enclosure;

(d) receiving internally packaged parts therebetween, and inserting at least one intermediate aluminum or aluminum alloy material members between said at least one extending groove portions and said at least one another extending groove portions; and (e) fitting said at least one extending groove portions, said at least one another extending groove portions, and said at least one intermediate aluminum or aluminum alloy material members, and causing said at least one extending groove portions, said at least one intermediate material portions, and said at least one another extending groove portions to be metal-bonded by press-forging.

8. The hermetically sealed chamber as claimed in claim 7, wherein said chamber comprises a substrate holder of a semiconductor fabrication equipment or a flat panel display fabrication equipment hermetically enclosing said internally packaged parts.

9. The hermetically sealed chamber as claimed in claim 8, wherein said substrate holder of said semiconductor fabrication equipment or said flat panel display fabrication equipment is surface-treated by alumite or plating.

* * * * *

UNITED STATES PATENT AND TRADEMARK OFFICE

CERTIFICATE OF CORRECTION

PATENT NO. : 6,371,357 B1
DATED : April 16, 2002
INVENTOR(S) : Katsumi Watanabe

It is certified that error appears in the above-identified patent and that said Letters Patent is hereby corrected as shown below:

Title page,
Item [73], Assignee, delete "Furakawa Electric Co., Inc." and insert therefor -- The Furukawa Electric Co., Ltd. --

Column 2,
Line 53, after "of" (second occurrence) delete ","

Column 15,
Line 11, after "b'=d" insert -- ' --

Column 21,
Line 7, after "in" delete "claims" and insert therefor -- claim --

Signed and Sealed this

Twenty-sixth Day of November, 2002

*Attest:*

JAMES E. ROGAN

*Attesting Officer*

*Director of the United States Patent and Trademark Office*